United States Patent [19]

Lorenz et al.

[11] 4,076,092
[45] Feb. 28, 1978

[54] GRILLE MOUNTING APPARATUS

[75] Inventors: Leo J. Lorenz, Farmington; Gary C. Stanek, Taylor, both of Mich.

[73] Assignee: Massey-Ferguson Inc., Detroit, Mich.

[21] Appl. No.: 712,290

[22] Filed: Aug. 6, 1976

[51] Int. Cl.² .......................................... B60K 11/04
[52] U.S. Cl. .................................. 180/68 P; 49/253; 49/395; 180/69 R
[58] Field of Search .............. 180/68 P, 69 R, 69 C; 49/253, 246, 395, 394, 465

[56] References Cited

U.S. PATENT DOCUMENTS

| | | | |
|---|---|---|---|
| 1,588,093 | 6/1976 | Carlson | 49/253 |
| 1,984,291 | 12/1934 | Van Ranst | 180/69 R |
| 2,468,809 | 5/1949 | Brock et al. | 180/69 R |
| 2,563,003 | 8/1951 | Chartier | 20/51 |
| 2,564,988 | 8/1951 | Muller | 20/16 |
| 2,576,316 | 11/1951 | Toth | 180/68 P |
| 2,794,511 | 6/1957 | Mackie | 180/69 R |
| 2,800,103 | 7/1957 | Bleeker | 49/465 |
| 2,962,107 | 11/1960 | Mihal et al. | 180/68 P |
| 3,195,945 | 7/1965 | Barenyi | 296/46 |
| 3,381,413 | 5/1968 | Schacht | 49/253 |
| 3,767,001 | 10/1973 | Chupick | 180/69 C |
| 3,845,585 | 11/1974 | Cecil | 49/139 |
| 3,884,322 | 5/1975 | Nemschoff | 180/69 R |
| 3,935,920 | 2/1976 | Schiel | 180/89 A |

Primary Examiner—David M. Mitchell
Attorney, Agent, or Firm—John C. Thompson

[57] ABSTRACT

A grille mounting apparatus operable to support a grille on a tractor grille frame assembly for swinging movement between a service position wherein the grille is disposed to one side of the tractor grille frame assembly and a normal operating position wherein the grille is disposed in juxtapositioned relationship with respect to an inwardly extending flange of the tractor grille frame assembly. Improved fastening means are utilized to maintain the grille in its normal operating position, which fastening means may be released without the use of tools to permit the grille to be moved to its service position.

8 Claims, 5 Drawing Figures

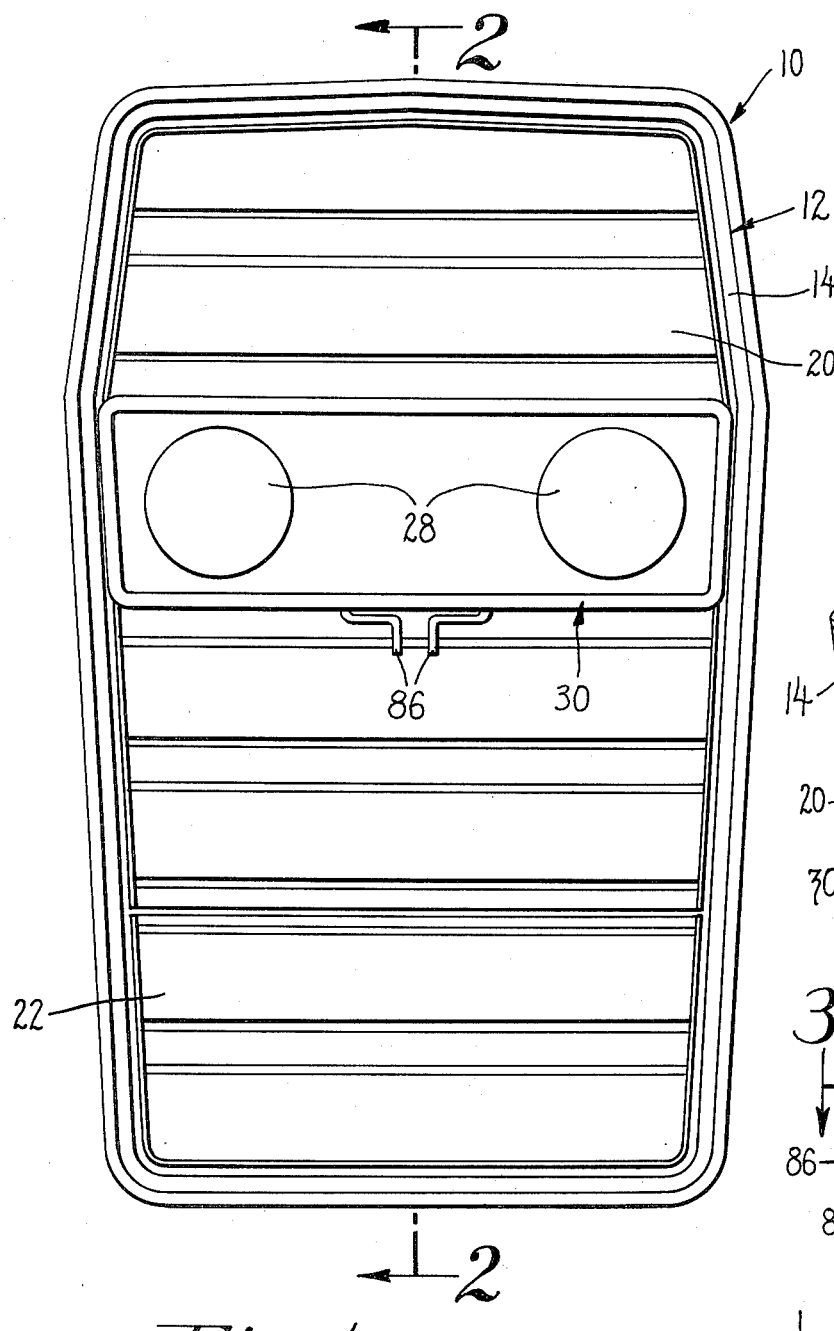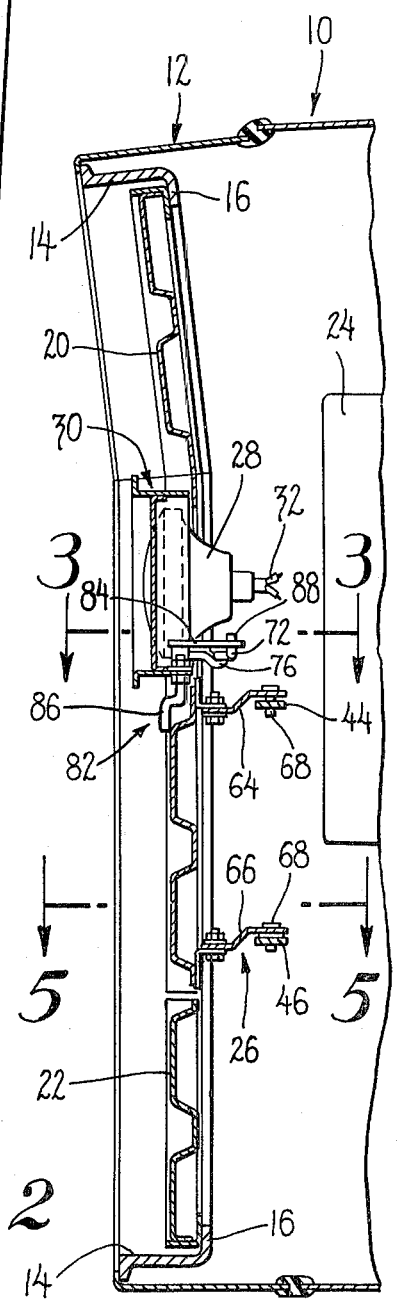
Fig. 1
Fig. 2

GRILLE MOUNTING APPARATUS

The present invention relates generally to a tractor grille assembly, and more particularly to the combination of a grille mounting apparatus, a grille, and a tractor grille frame assembly wherein the grille mounting apparatus includes support means operable to support the grille for movement between a service position wherein the tractor grille is disposed to one side of the tractor grille frame assembly and a normal position wherein the grille is disposed in juxtapositioned relationship with respect to inwardly extending flange means on the tractor grille assembly, the grille mounting apparatus also including fastening means operable to maintain the grille in its normal operating position.

Virtually all tractors are provided with a grille forward of the heat exchangers for the engine in order to prevent the radiating surfaces from being covered with an inordinate amount of debris. In some prior art designs the grille is secured to a tractor grille frame assembly by fastener means such as screws or the like. In many tractors it has become common to mount the air cleaner for the engine in a space forward of the conventional tractor radiator and behind the grille. As it is necessary to service the air cleaner periodically it is also common practice to removably mount grilles on a tractor grille frame assembly by latch means which can be operated by hands to permit the ready removal of the grille for servicing the air cleaner or of other components which may be disposed behind the grille. In some cases it may be desirable in some forms of tractors to mount headlamps within the area defined by the tractor grille frame assembly. The headlamps may be secured to a frame which is in turn secured to the tractor grille frame assembly. Alternatively, headlamps may be mounted directly on the grille. If they are mounted on the grille it may be necessary to remove the portion of the grille carrying the headlamps to service components behind the grille. Therefore, it is desireable to mount the grille in such a manner that the grille can be moved to a service position for servicing components behind the grille without disconnecting the wires which lead to the headlamps. Furthermore, it is essential that the grille be securely mounted in place when in its normal operating position. Additionally, it is desireable that the grille can be moved from its normal operating position to its service position by disengaging the fastening means which hold it in its normal operating position without the use of tools.

It is an object of the present invention to provide an improved grille mounting apparatus for mounting a grille on a tractor grille frame assembly provided with an inwardly extending flange wherein the grille mounting apparatus supports the grille for movement between a service position and a normal operating position, the grille mounting apparatus further including fastening means operable to maintain the grille in its normal operating position.

It is a further object of the present invention to provide a grille mounting apparatus which supports a grille for movement between a service position and a normal operating position wherein the grille mounting apparatus includes improved fastening means which securely maintains the grille in its normal operating position.

These other objects and advantages of the present invention will be apparent to those skilled in the art after a consideration of the following detailed description taken in conjunction with the accompanying drawings in which a preferred form of this invention is illustrated.

FIG. 1 is a front view of a tractor grille and grille frame assembly in which the principles of the present invention are incorporated.

FIG. 2 is a section taken generally along the line 2—2 in FIG. 1.

Figure 3:
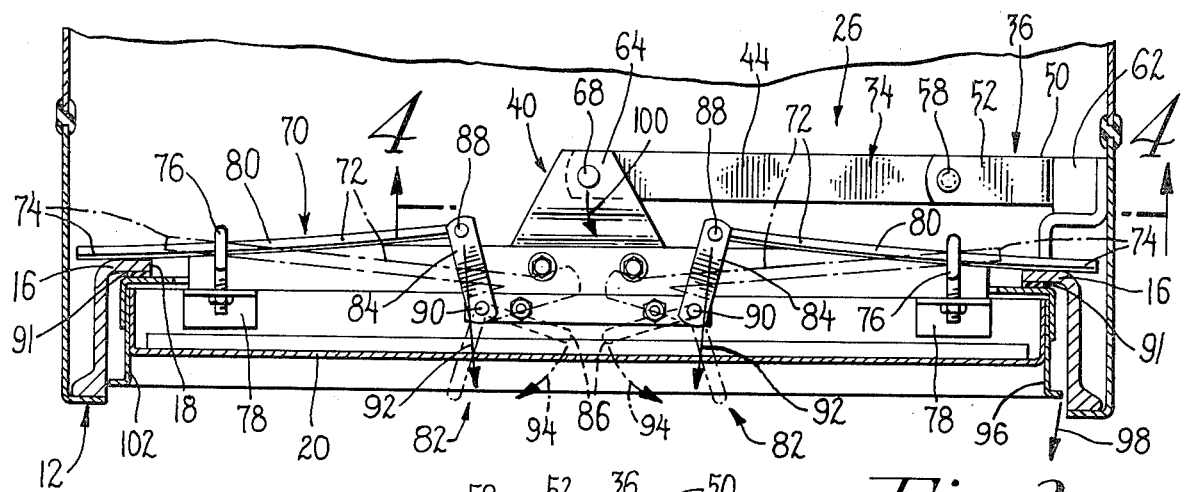
FIG. 3 is a section taken generally along the line 3—3 in FIG. 2.

Referring first to FIGS. 1 and 2, the front portion of a tractor is indicated generally at 10, the tractor including a tractor grille frame assembly indicated generally at 12. The tractor grille frame assembly includes a structure 14, commonly referred to in the trade as a horse collar, which structure 14 is provided with inwardly extending flange means 16 which defines an opening 18. One or more grilles may be mounted within the horse collar 14. In the embodiment shown in this drawings upper and lower grilles 20, 22 are mounted within the horse collar. The lower grille is secured in place by conventional fastener means and is customarily not removed for servicing various of the components mounted behind the grille, such as an air cleaner 24. As the lower grille 22 forms no part of the present invention it will not be discussed further.

Figure 5:
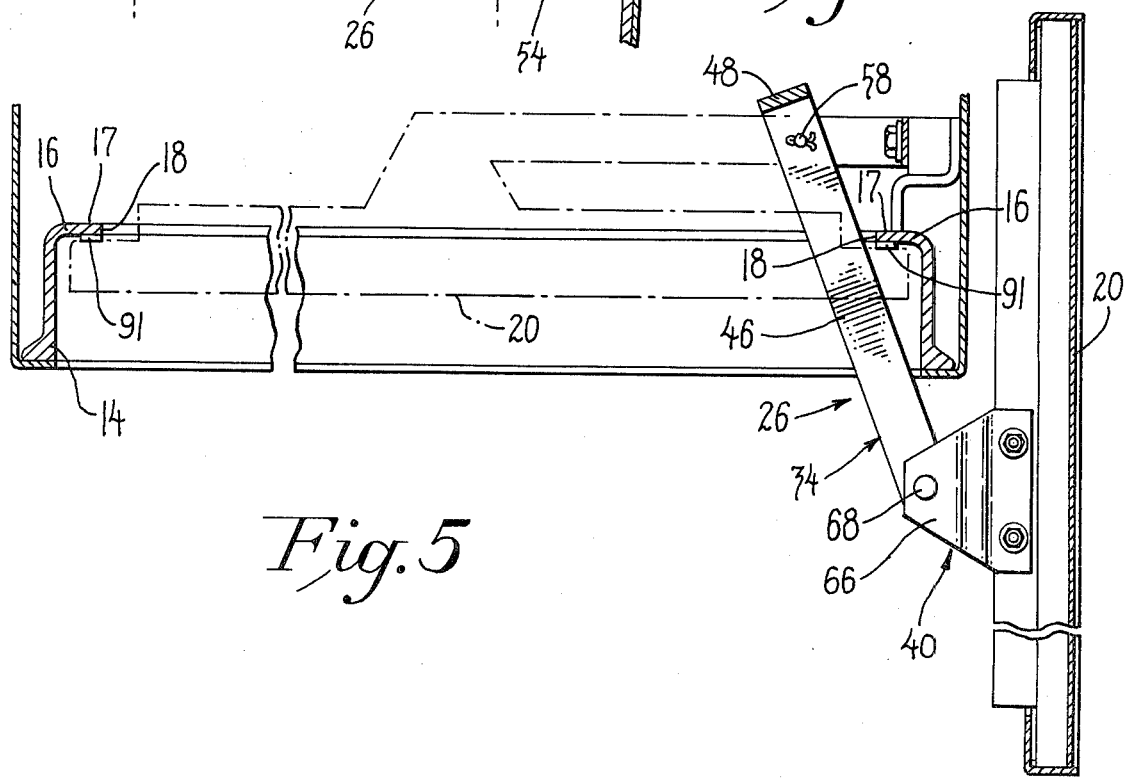
FIG. 5 is a somewhat simplified view taken generally along the line 5—5 in FIG. 2, the tractor grille being shown in its service position in full lines and in its normal operating position in broken lines.

The upper grille 20 is supported on support means, indicated generally at 26, for movement between a service position, as shown in full line in FIG. 5, wherein the grille 20 is disposed to one side of the tractor grille frame assembly 12, and a normal operating position, shown in broken lines in FIG. 5, wherein the grille is disposed in juxtapositioned relationship with respect to the inwardly extending flange means 16. The grille 20 carries headlamps 28, the headlamps being supported in a portion of the grille 30 in a generally conventional manner. The headlamps 28 are interconnected with a suitable source of electric current through wires 32.

Figure 4:
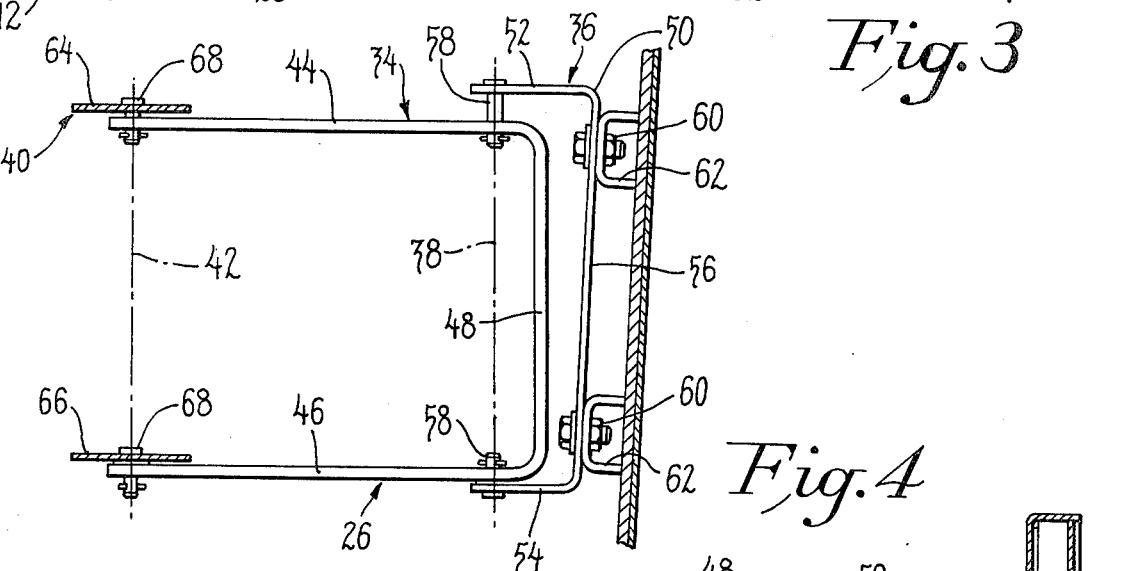
FIG. 4 is a section taken generally along the line 4—4 in FIG. 3.

Referring now principally to FIGS. 3 and 4, the support means 26 includes a support frame 34, first pivot means indicated generally at 36 which mounts the support frame on the tractor grille frame assembly for swinging movement about a first generally vertically extending axis indicated at 38, and second pivot means indicated generally at 40 which mounts the grille on the support frame 34 for swinging movement about a second generally vertically extending axis 42. The support frame includes a first generally U-shaped member having an upper arm 44, a lower arm 46, and an intermediate bight portion 48. The first pivot means 36 includes a second U-shaped structure 50 provided with an upper arm 52, a lower arm 54, and an intermediate bight portion 56. The first pivot means 36 further includes pivot pin means 58 which extend between the upper and lower arms 52, 54 of the second U-shaped structure and the upper and lower arms 44, 46, respectively of the first U-shaped structure, the pivot pin means 58 being secured in any conventional manner. The first pivot means 36 further includes mounting means for mounting the bight portion of the second U-shaped structure on the horse collar 14, the mounting means including fasteners 60 which pass through brackets 62 which are in turn welded or otherwise rigidly secured to the horse collar 14. The second pivot means includes upper and lower bracket 64, 66, respectively, which brackets are secured to a midportion of the grille as can best be seen from FIG. 3. Each of the brackets extend rearwardly and are provided with a rearwardly disposed aperture (no number) which is adapted to receive pivot shafts 68, which pivot shafts also pass through a corresponding aperture in the inner ends of 44, 48, said pivot shafts defining the second vertically extending axis 42.

Fastener means, indicated generally at 70 are provided to secure the grille 20 in its normal working position, which position is shown in full line in FIG. 3 and in broken lines in FIG. 5. The fastener means include a pair of spring rod means 72. The fastener means is shiftable between a first grille maintaining position and a disengaged position. When the fastener means is in the grille maintaining position each of the spring rods 72 is in the extended position shown in full lines in FIG. 3, and the outer ends 74 of the rods 72 will engage the rear surface 17 (FIG. 5) of opposed portions of the inwardly extending flange means 16. Similarly, when the fastening means is disposed in a second or disengaged position shown in broken lines in FIG. 3 the outer ends 74 of the spring rod means 72 will be disposed inwardly of the inwardly extending flange means 16 as can be seen from FIG. 3. In this second position the ends 74 will not engage the flange and therefore the grille 20 will be free to be moved from its normal working position to its service position shown in full lines in FIG. 5.

The fastening means 70 further includes a pair of eye bolts 76 which eye bolts are mounted on bracket 78 which are in turn interconnected with the grill 20. An intermediate portion 80 of each of the spring rod means passes through the eye of an associated eye bolt 76 the intermediate portion 80 cooperating with the associated eye bolt 76 to form biasing means which will bias an end of the spring rod in a forward direction in a manner more fully set forth below. A pair of shifting means indicated generally at 82 is provided for shifting the spring rod means 72 between their extended and retracted positions. Thus, each of the shifting means include a pivoted lever 84 and a handle 86. One end of the handle 86 is secured to the forward end of the pivoted lever 84 and swinging movement of the handle will cause corresponding movement of the lever 84. The inner end of the spring rod means 72 is bent upwardly as at 88 (FIG. 2) and passes through an aperture in the other end of the pivoted lever 84. In this connection it should be noted that the end 90 of the handle 86 which is secured to the pivoted lever 84 extends in a generally vertical direction and passes through a suitable aperture in the portion of the grille 30. By swinging the handle forwardly to the dot-dash position shown in FIG. 3 the spring rods 72 will be shifted from their extended position to their retracted position. When the spring rod 72 are in their extended position the intermediate portion 80 will be laterally deflected by the eyes of eye bolts 76 to thereby bias the opposed end of the spring rod 72 in a forward direction. As the outer end of the rod 72 engage the back of the flange 16 this will cause the grille to be held in juxtapositioned relationship with respect to the forward surface of the flange and in contact with a seal 91. The inner end of the spring rods will exert a force along the lines indicated by the arrows 92, and as the force line passes outside of that portion 90 of the handle which defines the pivot point for the levers 84 the levers can be considered to be in an over center position and will be maintained in that position by the spring force of the rod when the fastening means is in its first grille maintaining position.

In operation, when it is desired to move the grille 20 from its normal operating position to the service position shown in FIG. 5 the fastener means is shifted from the first grille maintaining position shown in full lines in FIG. 3 to a second position shown in broken lines in FIG. 3 by swinging movement of the handles in the direction indicated by the arrows in 94. This will shift the ends 74 of the spring rods from their extended position to their retracted position. When the ends of the rods 74 are in the retracted position one end 96 of the grille 20 is then swung in the direction indicated by the arrow 98 until it is free of the horse collar 14. As this initial movement takes place the first U-shaped structure will pivot slightly about the pivot pin means 58 in the direction indicated by the arrow 100 and the other end 102 will shift slightly to the right as viewed in FIG. 3. Once the end 96 is free of the horse collar 14 the entire grille may be swung about the pivot 58 and also about the pivot 68 until it attains the service position shown in FIG. 5. In order to place the grille in its normal operating position it is only necessary to reverse the movements described above. Once the grille has obtained its normal operating position it is then necessary to shift the fastening means to its first or FIG. 3 full-line grille maintaining position. As each of the rods 72 is shifted outwardly the end 88 of the rod 72 will move in a rearward direction as well as an outward direction. As the points contacted by the outer end 74 and intermediate portion 80 of the rod do not shift rearwardly it can be seen that as the rod obtains its fully extended position that the intermediate portion 80 of the rod will be engaged by the eye bolt and biased inwardly to thus dispose the various components in their normal operating positions, with the rod 72 being spring biased.

While a preferred structure in which the principles of the present invention have been incorporated are shown and described above, it is to be understood that the invention is not to be limited to the particular details, shown and described above, but that, in fact, widely differing means may be employed in the practice of the broader aspects of this invention.

What is claimed is:

1. A grille mounting apparatus in combination with a tractor adapted to be propelled in a forward direction, the tractor being provided with a grille and a grille frame assembly having an inwardly extending flange about an opening, the inwardly extending flange extending in a plane generally normal to the longitudinal axis of the tractor and having opposed portions extending towards each other across the opening: characterized by the grille mounting apparatus including:

support means interconnected with the tractor and operable to support the grille for movement between either a normal working position wherein the grille is disposed in juxtapositioned relationship with respect to the inwardly extending flange or a service position wherein the grille is disposed to one side of the normal working position of the grille, the support means permitting the grille to be initially swung forwardly of the grille frame assembly and then to one side of the grille frame assembly as the grille is moved from its normal working position to its service position; and fastening means engageable with the opposed portions of the inwardly extending flange and the grille and operable to maintain the grille in its normal operating position, the fastening means being shiftable from a first position wherein it engages said opposed portions of the inwardly extending flange to a second position wherein the fastening means does not engage said opposed portions of the inwardly extending flange, and wherein the fastening means includes biasing means operable to insure that the grille is maintained in its juxtapositioned relationship with respect to the inwardly extending flange when the fastening means is in its first position.

2. The grille mounting apparatus set forth in claim 1 in which the support means includes,
   a support frame; first pivot means to mount the support frame on the tractor grille frame assembly for swinging movement about a first generally vertically extending axis; and
   second pivot means to mount the grille on the support frame for swinging movement about a second generally vertically extending axis.

3. The grille mounting apparatus set forth in claim 1 wherein said support frame includes upper and lower generally horizontally extending spaced apart arms, and an intermediate portion interconnecting said arms adjacent said first pivot means.

4. The grille mounting apparatus set forth in claim 2 wherein the support frame includes a first generally U-shaped structure having upper and lower generally horizontally extending spaced apart portions and an intermediate generally vertically extending bight portion, and wherein the first pivot means includes a second U-shaped structure having upper and lower generally horizontally extending spaced apart arms and an intermediate bight portion, pivot pin means extending from the upper and lower spaced apart arms of the second U-shaped structure and interconnected with the upper and lower arms, respectively, of the first U-shaped structure, and mounting means mounting the bight portion of the second U-shaped structure on a side wall of the tractor grille frame assembly.

5. The grille mounting apparatus set forth in claim 3 wherein the second pivot means includes upper and lower spaced apart rearwardly extending brackets secured to a midportion of the grille, and pivot shaft means extending between the ends of the upper and lower spaced apart arms and the rear ends of the upper and lower brackets, respectively.

6. The grille mounting apparatus set forth in claim 1 in which the biasing means includes spring rods each being shiftable between an extended position wherein one end of said spring rod is disposed behind the inwardly extending flange when the fastener means is in its first position, and a retracted position wherein said one end of the spring rod is disposed inwardly of the opening defined by the inwardly extending flange when the fastener means is in its second position, said spring rod being laterally deflected with respect to its axis when in its extended position to bias said grille towards the inwardly extending flange.

7. The grille mounting apparatus set forth in claim 6 wherein an intermediate portion of each of the spring rods passes through the eye of an eye bolt, said eye bolt being secured to said grille, and wherein the fastening means further includes a pivoted lever one end of which is pivotally secured to the grille, and the other end of which is pivotally secured to the other end of the spring rod remote from said one end, the pivoted lever being disposed in an over-center position when the fastener means is disposed in its first position with said other end of the spring rod being disposed away from said grille, and said other end of the spring rod being disposed closely adjacent said grille when the fastening means is disposed in its second position.

8. A grille mounting apparatus in combination with a tractor adapted to be propelled in a forward direction, the tractor being provided with a grille and a grille frame assembly having an inwardly extending flange about an opening, the inwardly extending flange extending in a plane generally normal to the longitudinal axis of the tractor and having opposed portions extending towards each other across the opening: characterized by the grille mounting apparatus including:
   support means interconnected with the tractor and operable to support the grille for movement between either a normal working position wherein the grille is disposed in juxtapositioned relationship with respect to the inwardly extending flange or a service position wherein the grille is disposed to one side of the normal working position of the grille, the support means permitting the grille to be initially swung forwardly of the grille frame assembly and then to one side of the grille frame assembly as the grille is moved from its normal working position to its service position; and
   fastening means engageable with the opposed portions of the inwardly extending flange and the grille and operable to maintain the grille in its normal operating position, the fastening means include a pair of transversely spaced apart eye bolts mounted on said grille and having eyes disposed rearwardly of said grille, a pair of spring rods, each of which has a intermediate portion passing through the eye of an associated eye bolt, and shifting means operable to shift the spring rods between extended and retracted positions, the shifting means including a pair of pivoted levers each of which is associated with one of the spring rods, one end of each of the pivoted levers being pivotally secured to the grille, and the other end of each of the pivoted levers being pivotally secured to one end of an associated spring rod, and handle means secured to each of the pivoted lever means and operable to swing the pivoted lever means between first and second positions, whereby when each of the pivotal lever means is in its first position the associated spring rod is in an extended position with the other end being disposed behind said inwardly extending flange and the intermediate portion of the associated spring rod being engaged by the associated eye and laterally deflected thereby, said lever means being disposed in an over-center position when in its first position whereby the lateral forces imposed upon the lever means by the spring rod serves to maintain the lever means in the first position, and when each of the pivoted lever means is in its second position the associated spring rod is in a retracted position with the outer end of the spring rod being disposed inwardly of the inwardly extending flange.

* * * * *

UNITED STATES PATENT OFFICE
CERTIFICATE OF CORRECTION

Patent No. 4,076,092               Dated February 28, 1978

Inventor(s) Leo J. Lorenz and Gary C. Stanek

It is certified that error appears in the above-identified patent and that said Letters Patent are hereby corrected as shown below:

In claim 3 line 22 cancel "1" and insert --2--.

Signed and Sealed this

Twenty-second Day of July 1980

[SEAL]

Attest:

SIDNEY A. DIAMOND

Attesting Officer           Commissioner of Patents and Trademarks